United States Patent [19]
Leach

[11] 4,272,345
[45] * Jun. 9, 1981

[54] ENERGY CONSERVATION TECHNIQUE

[76] Inventor: Sam L. Leach, P.O. Box 1190, Pebble Beach, Calif. 93953

[*] Notice: The portion of the term of this patent subsequent to Sep. 12, 1995, has been disclaimed.

[21] Appl. No.: 89,527

[22] Filed: Oct. 29, 1979

Related U.S. Application Data

[63] Continuation-in-part of Ser. No. 65,188, Aug. 9, 1979, which is a continuation-in-part of Ser. No. 879,226, Feb. 21, 1978, Pat. No. 4,193,879, which is a continuation-in-part of Ser. No. 790,320, Apr. 25, 1977, Pat. No. 4,113,589, and Ser. No. 834,682, Sep. 19, 1977, Pat. No. 4,148,701.

[51] Int. Cl.³ .................. B01J 19/08; C01B 3/06; C01B 15/01
[52] U.S. Cl. .................. 204/157.1 R; 250/527; 423/648 R; 423/584
[58] Field of Search .................. 204/157.1 R; 250/527; 423/648 R, 657, 584

[56] References Cited

U.S. PATENT DOCUMENTS 3,853,482  12/1974  Tej Bhan .................. 423/584
4,113,589  9/1978  Leach .................. 204/157.1 R Primary Examiner—Howard S. Williams
Attorney, Agent, or Firm—Poms, Smith, Lande & Rose

[57] ABSTRACT

Waste heat which would otherwise be lost up a stack or chimney may be employed to generate hydrogen or hydrogen peroxide through the use of special equipment including a heat exchange structure associated with the stack or chimney. Through one heat exchange structure, water is formed into steam. Then, in one or more additional heat exchangers, the steam is converted into hydrogen gas and/or hydrogen peroxide. The active material in the additional heat exchanger arrangements may include both (1) a metal oxide, such as manganese oxide, which successively sequesters oxygen from water vapor, and then as the pressure is reduced in later portion of the cycle, releases the captured oxygen; and may also or alternatively include (2) host and sensitizer material for shifting the output radiation into one of the absorption bands for water vapor. Additionally, through the very high intensity infrared radiation which is applied in a concentrated manner to the steam, further dissociation of the water vapor by the phenomenon of multiphoton absorption, is obtained; and suitable resonant cavity and high pass filtering film arrangements may be employed to shift the frequency of radiation applied to dissociate the water vapor into the ultraviolet frequency range.

22 Claims, 15 Drawing Figures

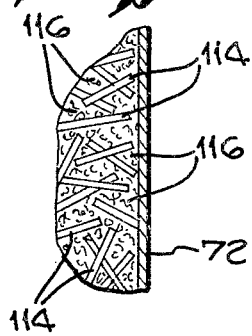
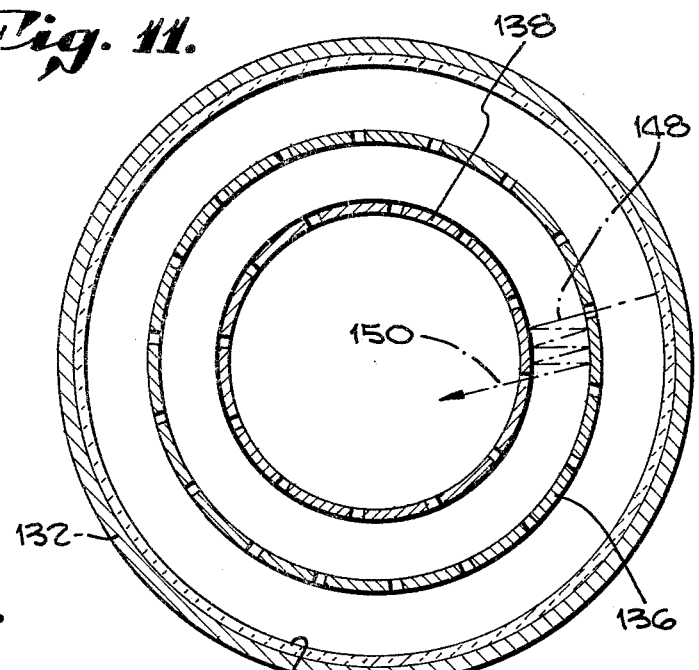
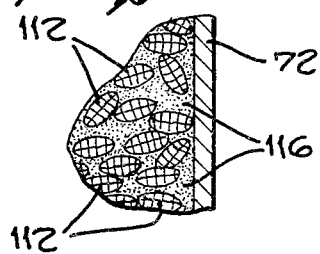
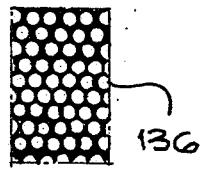
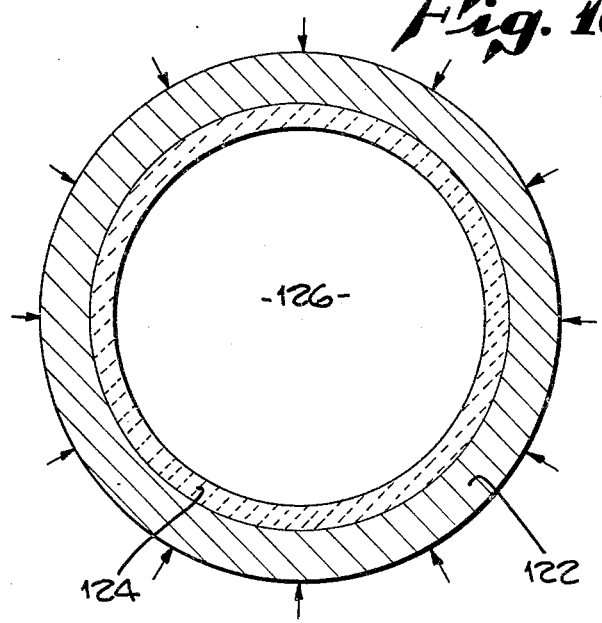
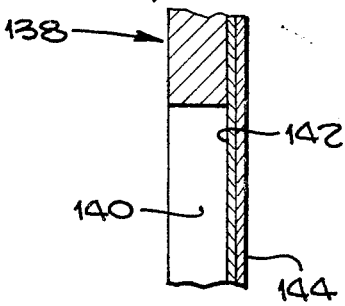

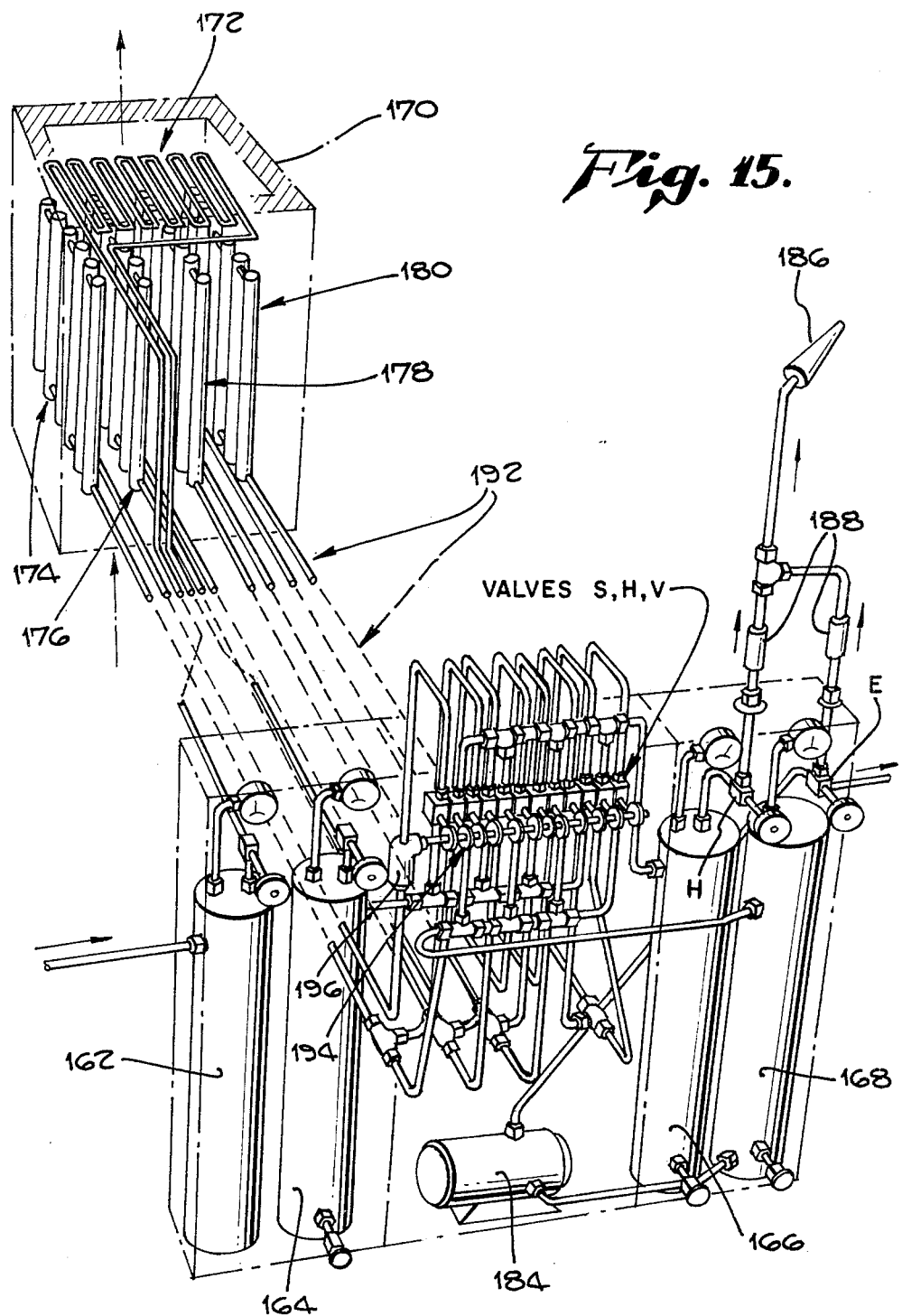

4,272,345

ENERGY CONSERVATION TECHNIQUE

RELATED PATENT APPLICATION AND PATENTS

This patent application is a continuation-in-part of my U.S. patent application Ser. No. 065,188, filed Aug. 9, 1979; the said patent application Ser. No. 065,188 being a continuation-in-part of U.S. patent application Ser. No. 879,226, filed Feb. 21, 1978, now U.S. Pat. No. 4,193,879; which is in turn a continuation-in-part of Ser. No. 790,320, Apr. 25, 1977, now U.S. Pat. No. 4,113,589, and Ser. No. 834,682, filed Sept. 19, 1977, now U.S. Pat. No. 4,148,701.

BACKGROUND OF THE INVENTION

This invention relates to arrangements for generating hydrogen and/or hydrogen peroxide from waste heat, such as that passing up an industrial stack or chimney.

A recent book which has generated much interest in Washington, D.C. and throughout the country is entitled, "Energy Future", and was edited by Robert Stobaugh and Daniel Yergin. This authoritative book includes the following quotations:

"There is a source of energy that produces no radioactive waste, nothing in the way of petrodollars, and very little pollution. Moreover, the source can provide the energy that conventional sources may not be able to furnish. To be semantically accurate, the source should be called conservation energy to remind us of the reality—that conservation is no less an energy alternative than oil, gas, coal or nuclear. Indeed, in the near term, conservation could do more than any of the conventional sources to help the country deal with the energy problem it has."

"As two prominent analysts, Lee Schipper and Joel Dormstadter, have expressed it: 'The most impelling factor in encouraging conservation action is the cost of not conserving'."

"It is well known that vast amounts of energy are radiated up industrial stacks into the air—or into lakes, rivers or oceans. This is called waste heat/energy."

"At a typical electric utility generating plant, up to two thirds of the fuel's potential energy is lost as discharged waste heat. Meanwhile, industrial waste heat has been estimated at 20 percent of total national energy consumption."

In the same book it is stated that the energy consumption in the United States in 1977 when converted into equivalent barrels of oil per day, is equal to approximately 36.7 millions of barrels per day, with each one million barrels of oil per day being equivalent to approximately $2.12 \times 10^{15}$ BTUs per year. Using the figure of industrial waste heat being in the order of 20 percent of the total national energy consumption, this means that we are wasting in this one area along, approximately 7 or 8 million barrels of oil per day equivalent, and this corresponds to about $15 \times 10^{15}$ BTUs per year. Assuming a conservative cost of about $2.00 per million BTUs, the annual loss is more than $3 \times 10^{10}$ or over 30 billion dollars for the year 1977.

Although various proposals have been made for utilizing the waste heat lost going up the stacks of chimneys, up to the present time commercial efforts to recover this waste heat and to convert it efficiently and economically into useful forms of energy have not justified the investment.

Accordingly, a principal object of the present invention is to provide an economical manner of directly recovering the wasted heat and providing the recovered energy in a useful form which may be readily and conveniently employed.

SUMMARY OF THE INVENTION

In accordance with the present invention, apparatus operating on the general principles outlined in my U.S. Pat. Nos. 4,113,589 and 4,148,701 may be employed to utilize waste heat from industrial processes and to directly generate hydrogen gas and/or hydrogen peroxide.

More specifically, in accordance with the present invention, heat exchanging arrangements are coupled to a stack or chimney in a streamlined manner to avoid introducing undue back pressure into the stack or chimney; steam is generated from the waste heat; and then the steam is dissociated to form hydrogen gas and hydrogen peroxide.

The dissociation step is accomplished by an oxygen sequestering step, and/or by the application of high intensity radiation within the absorption band or bands of water through the use of special host and sensitizer materials which absorb radiation from the walls of the heat exchanger directly or indirectly and re-radiate the desired frequencies at exceedingly high intensities.

In accordance with one aspect of the invention, the heat exchangers may take the form of pipes which extend through the walls of the chimney or stack, in an open configuration to absorb some portion of the waste heat without creating any significant back pressure retarding the flow of gases. A small portion of the available heat absorbed by the heat exchange structure may be used to convert water into steam or water vapor, and the greater portion of the space within the heat exchanger may contain material, such as a suitable metal oxide, and/or host and sensitizer material, for the sequestering and radiation steps mentioned hereinabove.

Additional aspects and features of the invention include the following:

(1) A metal oxide is selected which will absorb oxygen from water vapor at the ambient temperatures provided by the stack;

(2) Host and sensitizer materials are selected which will absorb energy at the ambient temperature and which will radiate energy within the absorption band or bands of water vapor or other gases to be dissociated.

(3) A series of units may be provided in a single stack operative at progressively lower temperatures so that a larger proportion of the waste heat may be recovered;

(4) Any desired portion of the generated hydrogen and/or hydrogen peroxide may be routed back to the main process or to directly raise the temperature of the heat exchanger containing the metal oxide, so that the hydrogen or hydrogen peroxide may be continuously employed to reduce the total amount of energy input;

(5) The system external to the stack may include a heat exchanger in which the hot hydrogen and/or hydrogen peroxide as it is formed warms the input water which is subsequently converted to steam;

(6) A negative pressure tank is provided to withdraw oxygen either alone or as carbon dioxide, as it is disproportionated from the metal oxide reactant;

(7) Arrangements may be provided for passing carbon monoxide from the waste gases in the stack over the metal oxide to facilitate the disproportionation of the oxygen;

(8) The heat exchange structures within the stack or chimney may be a series of spaced pipes extending generally vertically or in the direction of gas flow to minimize back pressure;

(9) Each unit may include a series of heat exchanging reaction chambers operated sequentially, to continuously generate hydrogen or hydrogen peroxide;

(10) The heat exchange tubes may be coated internally with host and sensitizer material to directly irradiate the steam in a continuous process; and

(11) Suitable resonant cavities and a high pass filtering film may be provided to shift the radiation applied to the water vapor into the ultraviolet spectrum.

An important advantage of the present invention is its applicability to existing facilities, as a "technical fix" to significantly increase the efficiency of the many industrial plants which now radiate and waste vast quantities of heat energy.

Other objects, features, and advantages will become apparent from a consideration of the following detailed description and from the accompanying drawings.

BRIEF DESCRIPTION OF THE DRAWINGS

FIGS. 8 and 9 are showings of alternate reaction material arrangements which may be contained in the heat exchanger structures shown in earlier figures of the drawings;

FIG. 10 is a cross sectional view of an alternative form of heat exchange pipe and water dissociation arrangement which may be employed in a continuous process using the heat exchange configurational arrangements shown in any of the prior figures of the drawings;

FIGS. 11, 12 and 13 show another alternative continuous flow embodiment of the invention, in which ultraviolet radiation is applied to the water vapor; and FIGS. 14 and 15 are a block diagram and an exemplary installation, respectively, of another embodiment, using several sequentially operated reaction chambers.

DETAILED DESCRIPTION

Figure 1:
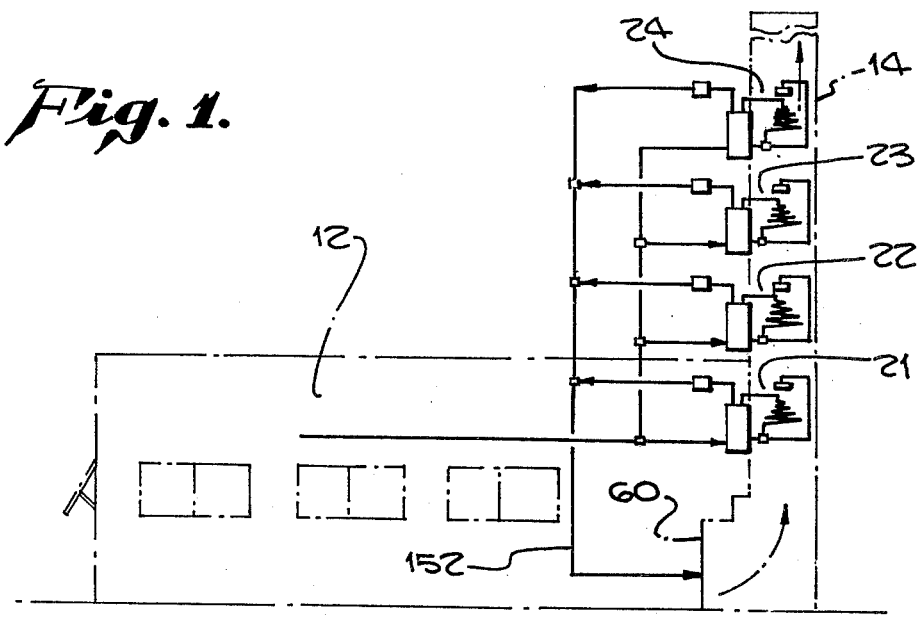
FIG. 1 is a diagrammatic showing of an industrial plant including a stack equipped with a series of units coupled to the stack to generate hydrogen from the waste heat.

Referring more particularly to the drawings, FIG. 1 shows an industrial building 12 which is provided with a stack or chimney 14. In the normal course of operation of the industrial facility, substantial heat is lost through the chimney 14 in the form of hot gases which pass up the chimney 14. In accordance with the present invention, a series of waste heat energy recovery units 21 through 24 are provided to convert the waste heat to burnable fuel, such as hydrogen gas or hydrogen peroxide.

Figure 2:
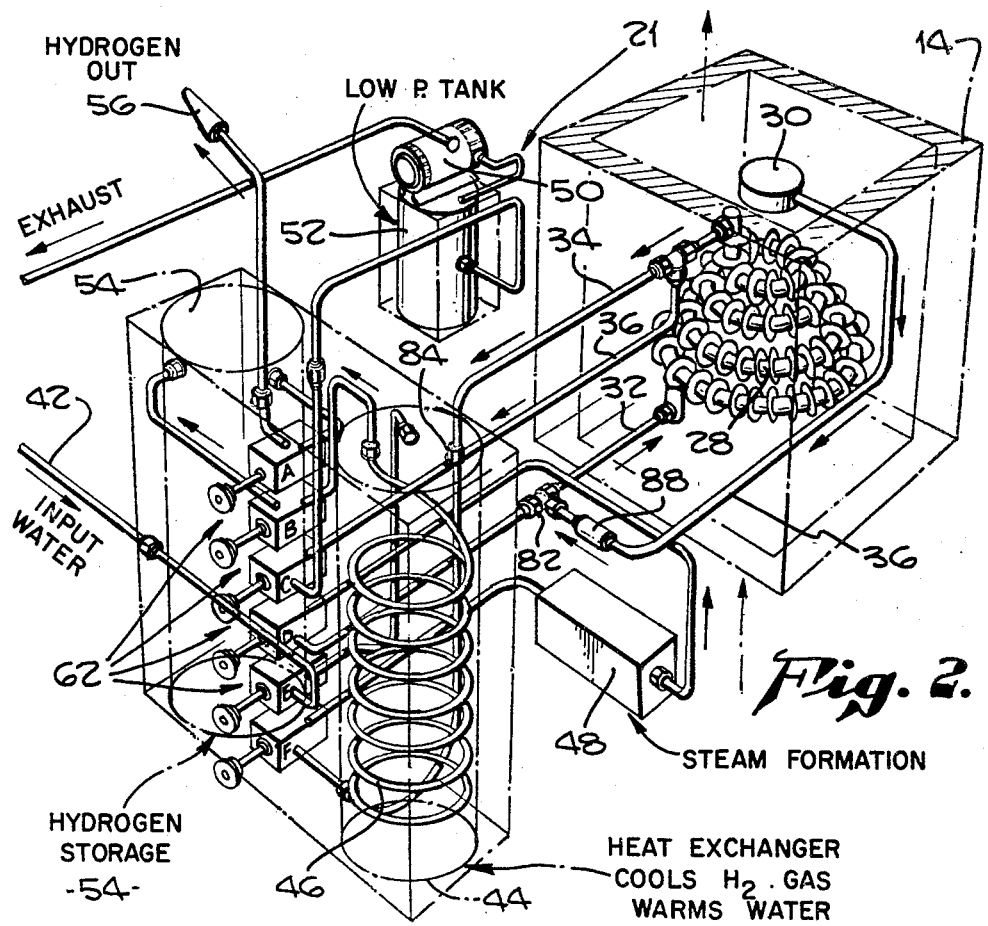
FIG. 2 is a diagrammatic showing of one illustrative unit for converting waste heat to hydrogen gas and/or hydrogen peroxide.

FIG. 2 is a detailed showing of one illustrative implementation of one of the units 21 of FIG. 1. The units such as 21 include two principal sets of equipment, one of which is located within the chimney or stack structure 14, and the other being immediately adjacent and external thereto. Within the chimney 14 is an open heat exchanging conduit configuration 28 and a cup-shaped member 30 for absorbing heat or heated gases passing up the stack 14. Steam to be dissociated to form hydrogen gas is supplied to the reaction chamber within tubing 28, through the conduit 32. Gases are withdrawn from the tubing 28 through the conduits 34 and 36. Heat or heated gases picked up by the cup-shaped element 30 are brought out from the stack 14 through conduit 36.

The major components external to the stack 14 include a source of input water 42, a heat exchanging tank 44 within which the input water is stored, and through which the output hydrogen and/or hydrogen peroxide passes within the coiled conduit 46, thereby cooling the hydrogen gas and providing initial heating for the water within tank 44. From the tank 44, the water is routed to the steam generation unit 48. Incidentally, the steam generation unit 48 may be implemented by a few turns of metal tubing within the stack 14, rather than by an external unit as shown in FIG. 2. Also shown in FIG. 2 is the vacuum pump 50 and the reduced pressure tank 52. Hydrogen and/or hydrogen peroxide, formed in the reaction conduits 28, are stored in the tank 54. The burner 56 indicates schematically the utilization of the hydrogen gas which has been stored in tank 54. In practice, the gas may be directed back to a furnace or other utilization equipment 60 in FIG. 1, to reduce the input fuel requirements for the industrial facility 12. The process may be carried out cyclically through the use of the valves 62 as shown in FIG. 2. These valves may be either cam actuated, or they may be implemented by electromagnetic valve actuators.

In connection with the implementation and operation of the apparatus of FIG. 2, reference is again made to my prior U.S. Pat. Nos. 4,113,589 and 4,148,701, and the contents of these two prior patents are hereby incorporated by reference into the present specification. In this connection, reference is made to FIG. 5 of U.S. Pat. No. 4,113,589 in which cam actuated arrangements for a similar apparatus are disclosed; and to FIG. 7 of U.S. Pat. No. 4,148,701, in which the staggered cyclical operation of a related unit is graphically analyzed. It is noted in passing that the apparatus of U.S. Pat. Nos. 4,113,589 and 4,148,701 were not associated with, and did not involve, the formation of hydrogen from waste industrial heat. The present invention does so relate, and involves the recognition that the heat which would otherwise be lost up an industrial stack or chimney can be reclaimed through the generation of fuel, such as hydrogen or hydrogen peroxide in a simple, convenient and efficient manner. In addition, the present invention involves significantly different structural arrangements and configurations from those shown in the prior patents, and have been designed to implement the waste heat recovery system.

Figure 5:
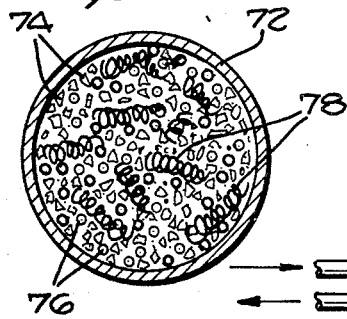
FIG. 5 is a cross sectional view through one of the heat exchanger tubes as shown in FIG. 2, 3 or 4.

Turning for the moment to FIG. 5, this is a cross-sectional view through a pipe 72 of high temperature resistant material which may be employed to implement the conduit 28 as shown in FIG. 2, or similar structures shown in other embodiments of the drawings. Within the conduit 72 is a mass of finely divided material such as manganese oxide 74 and additional material, such as the spherical metal balls 76 and the stainless steel metal turnings 78, which increase the void volume within the conduit 72 and permit freer flow of gas through the conduit 72. The size of the manganese oxide particles may be in the order of one hundredth of an inch in their largest dimension, or about 0.010 inch.

Now, when steam is supplied to the conduit 72 and passed over the manganese oxide, with the oxide at an elevated temperature, the manganese oxide is further oxidized to a higher oxidation state, and the oxygen in the water vapor is thereby sequestered. The reaction is substantially as follows, in one of a number of alternative modes:

$$Mn_2O_3 + H_2O \rightarrow 2MnO_2 + H_2 \uparrow \quad (1)$$

The foregoing reaction occurs at a temperature above atmospheric pressure and this can range from a few pounds per square inch above atmospheric pressure to many atmospheres, depending on the desired output pressure of the hydrogen.

Subsequently, the pressure within the heat exchanger is reduced, to atmospheric pressure or less, preferably in the order of about 1/10th atmospheric pressure, and the oxygen is disproportionated from the manganese oxide and it returns to its lower oxidation state as follows:

$$4MnO_2 \rightarrow 2Mn_2O_3 + O_2 \uparrow \quad (2)$$

Incidentally, for the above reactions to go forward in the indicated manner, the temperature of the reactant should be substantially above 535 degrees C., which is the temperature at which $MnO_2$ will dissociate to $Mn_2O_3$. Accordingly, it is desirable to operate at temperatures well above 535 degrees C., and satisfactory sequestering and disproportionating operation has been achieved at temperatures from 600 degrees C. to 950 degrees C., by way of example.

In some cases, it is convenient to facilitate the disproportion of oxygen from the metal oxide by the reaction set forth in equation (3) set forth below.

$$2MnO_2 + CO \rightarrow Mn_2O_3 + CO_2 \uparrow \quad (3)$$

This may be accomplished when the waste gases passing through the stack of 14 have a high carbon monoxide content. Referring back to FIG. 2 the cup 30 is employed to pick up some of the waste gases containing carbon monoxide from stack 14 for utilization in the reaction set forth at (3) above.

As indicated by Equation (1) and Equations (2) or (3), the process as described hereinabove is implemented in two successive stages, with the first stage involving the dissociation of steam and the second stage involving the disproportionation of oxygen from the metal oxide, such as $Mn_2O_3$. This cycling may be accomplished through the use of the valves 62 as shown in FIG. 2. For convenience in following brief description, the valves 62 are referred to by their reference letters A through F. Initially, it will be assumed that the manganese is in its lower oxidation state as $Mn_2O_3$, and that steam is to be admitted to the reaction coils 28 containing the manganese oxide. Under these conditions, the valve 62F is open supplying pressure to move the water through the steam generator 48. Output steam from unit 48 passes through the open valve 62D through the T-junction 82 and into the reactant filled coils 28. With valve 62B open and valve 62C closed, the generated hydrogen passes through the T-junction 84, the cooling coil 46, and through valve 62B to the hydrogen storage tank 54.

Subsequently, during the disproportionation of the oxygen from the manganese oxide in accordance with Equation (2) or Equation (3), the valve 62C is open, and 62B is closed, so that the manganese oxide in the higher oxidation state in the heat exchanger 28 is subjected to reduced pressure whereby the oxygen is drawn off. In addition, if desired, with the valve D being closed, waste gas may be drawn through the check valve 88, from cup 30 so that both equation (2) and equation (3) are implemented concurrently.

Incidentally, concerning valve 62A, when it is desired to draw off some hydrogen from the storage tank 52 and burn it at the burner 56, or utilize it elsewhere, the valve 62A is opened.

Figure 3:
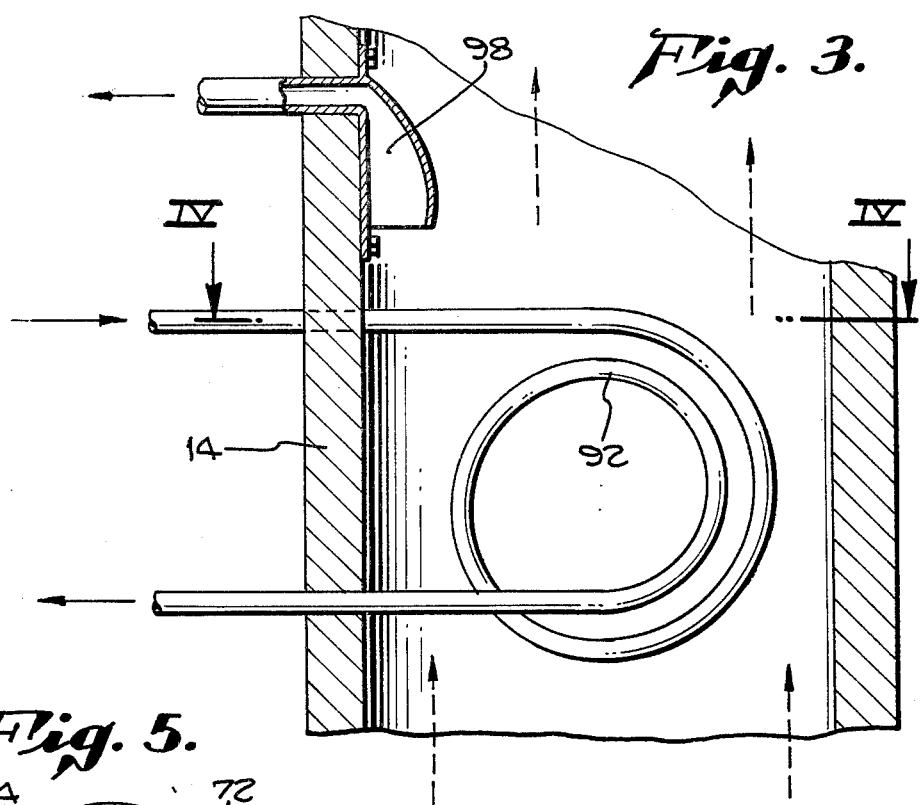
FIGS. 3 and 4 are side and top views, respectively, of another form of heat exchanger shown mounted in a stack or chimney.
Figure 4:
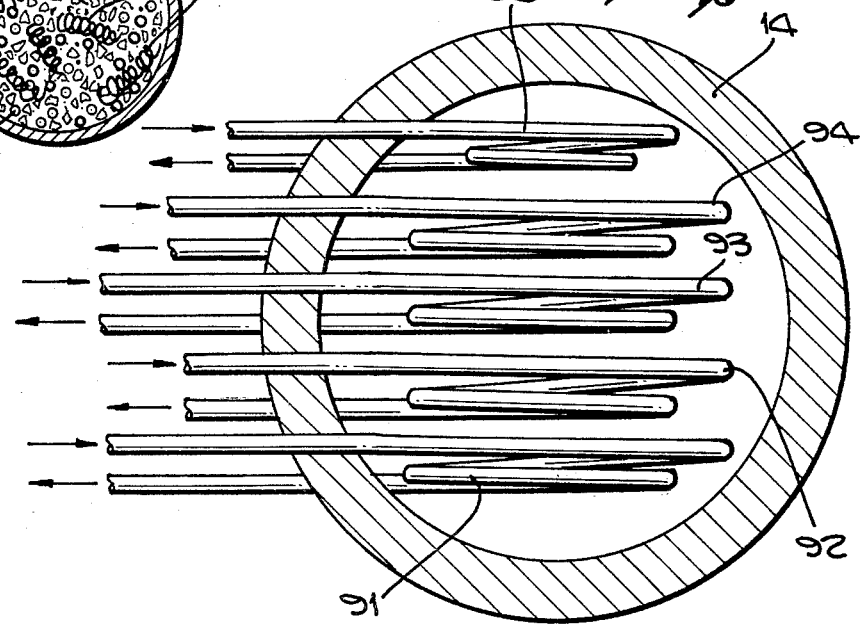

FIGS. 3 and 4 show an alternative arrangement for implementing the heat exchanger portions, such as the conduit 28 in FIG. 2, and the similar structures in units 21 through 24 of FIG. 1. More specifically, in FIGS. 3 and 4, the chimney or stack 14 includes four two-turn heat exchange conduits 91 through 94 and a fourth two-turn conduit 96 which is of smaller diameter and which serves to generate steam. As in the case of the arrangements shown in FIGS. 1 and 2, the system of FIGS. 3 and 4 includes the stack 14, and also includes a pickup funnel or duct 98 to receive exhaust gases for the implementation of equation (2) and equation (3), as discussed hereinabove.

The system shown in FIGS. 3 and 4 was designed to produce approximately 15 cubic feet of hydrogen gas per minute, or approximately 900 cubic feet per hour, corresponding to 292,500 BTUs per hour. The amount of loosely filled reactant in the four tubes 91 through 94 is approximately 693 cubic inches. Incidentally, as a matter of interest, the weight of reactant is approximately 49 grams per cubic inch. Using a 1½ inch diameter tube, between 32 and 33 feet of conduit are required. This means that each of the four tubes is in the order of 8 to 8½ feet in length. A two-turn coil, with the outer diameter in the order of 20 or 21 inches, and the inner turn in the order of 14 or 15 inches in diameter, gives the approximate length which is required. To avoid undue back pressure within the stack, the coils 91 through 94 may be laterally spaced apart from one another by approximately 2 inches or more.

It may be noted that the axis of the turns is horizontal, and this is preferred rather than having the reactant lying in a conduit which extends generally horizontally. If such latter construction were employed, it would be possible that the reactant would settle to some extent so that the steam or water vapor would by-pass the reactant, thereby possibly avoiding dissociation.

Figure 6:
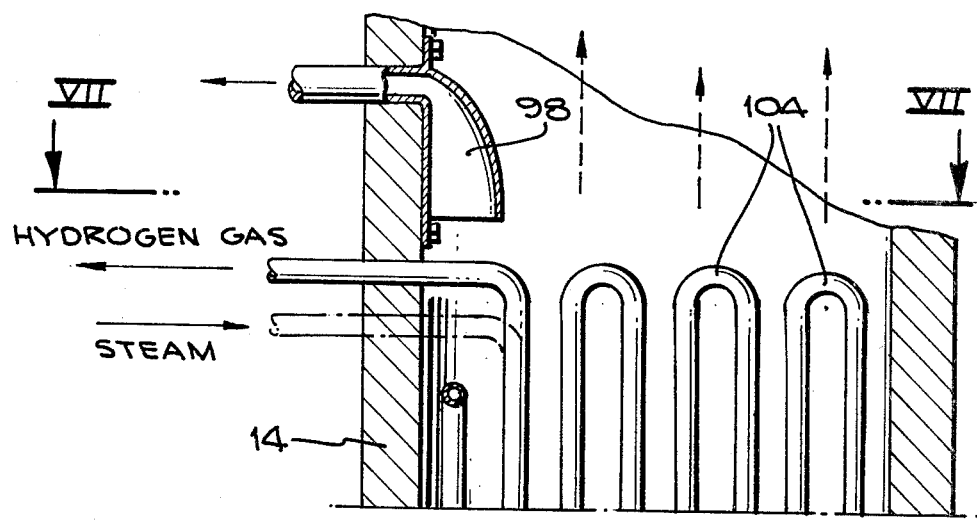
FIGS. 6 and 7 show an alternative form of heat exchanger which may be employed in place of that shown in FIG. 2 or in FIGS. 3 and 4.
Figure 7:
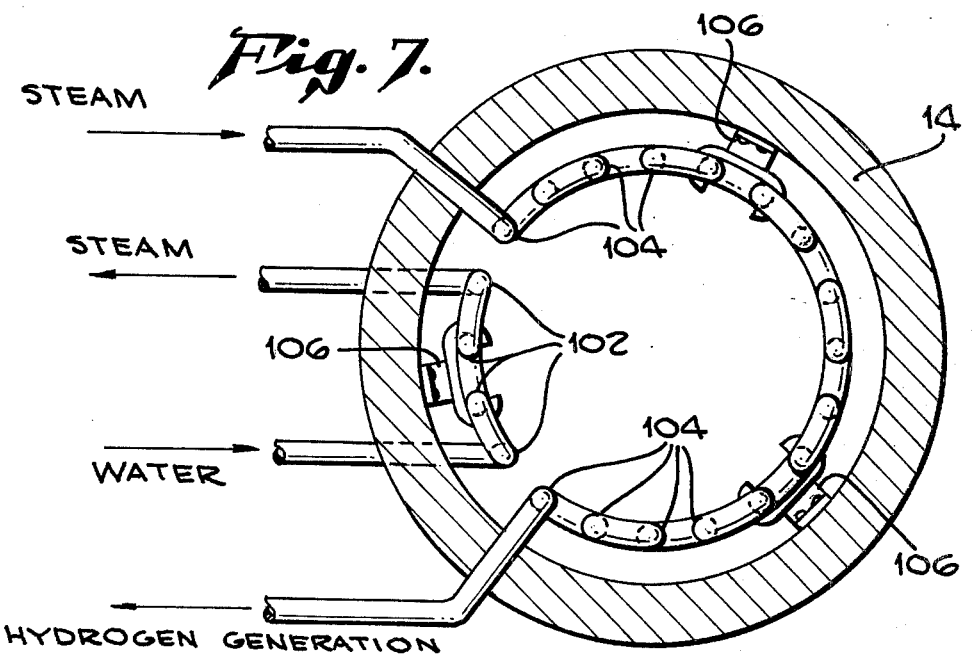

FIGS. 6 and 7 show an alternative arrangement in which a somewhat different configuration of conduits containing reactant is employed. Specifically, in FIGS. 6 and 7 a series of vertically extending pipes are assembled to extend around the inner periphery of a predetermined section of the vertically extending stack 14. As shown in FIGS. 6 and 7, a short section of several pipes or conduits 102 are employed to generate steam, and the major section of the vertically extending assembly of pipes 104 is used in the main reaction. The heat exchange structure 104 may be subdivided into four sections to correspond to the arrangement of FIG. 4, or may be a single longer conduit more similar to that shown in FIG. 2 of the drawings. The heat exchange structure may be secured in position by any suitable means, such as by fasteners 106.

In addition to the formation of hydrogen by the sequestering of oxygen from water vapor, the present invention also contemplates the dissociation of water vapor by irradiation of the water vapor within the absorption bands of water vapor, and also through the phenomenon of multiphoton absorption by the water vapor.

With regard to this phase of the invention, attention is directed to my prior U.S. Pat. No. 4,148,701, in which the portion of the specification starting in Column 13 is particularly pertinent. A brief summary of the concepts which are involved will be repeated here.

Initially, it is noted that the theory of MASERS and LASERS form a background for this portion of the specification. The word LASER is an acronym which stands for Light Amplification by the Stimulated Emission of Radiation. The maser/laser type of acronym may also be applied to another system termed "HASER", an acronym for "Heat Amplification by Stimulating Emission of Radiation". As will be developed below, the term "amplification" is not used in the sense of increasing signal strength, but in the sense of amplifying the effectiveness of heat energy.

The Haser application depends not as much on coherence or monochromaticity per se, but rather on the unprecedented energy per unit area. This radiated energy is a by-product of the coherence of the radiation, and can be many orders of magnitude greater in energy than normal incoherent thermal radiation. To understand why this is possible, it is necessary to review briefly a few of the basic differences between the incoherent radiation produced by an ordinary bright source and the coherent light (radiation) produced by a laser or maser.

In a conventional source the atoms of a solid (or a gas) are agitated either thermally or electrically to higher energy states. When these atoms return spontaneously to their lower levels, they radiate some of their excess energy as light. Since each atom behaves independly at this state, its emission is at a random time and in a random direction with a random polarization.

It follows that the light radiated in a single direction is the complex sum of all the light from the individual atoms. The phases of any two atoms will tend to cancel their radiation in some directions and enhance it in others. The total energy of the source will be on the average be radiated uniformly in all accessible directions, and the amount of energy observed in a given direction will be proportional to the solid angle subtended by the observing device. In the Haser interior the observing device is either a water-vapor molecule (or other feedstock) or another particulate of reactant.

The maximum total energy that can be radiated by a given source depends on two factors: the surface area of the source and the maximum temperature to which the source has been heated. Therefore, in practice, the only way to increase the power output from an ordinary source beyond the limitations imposed by the source material is to increase the surface area of the source.

Power output, however, is only half the solution. Concentrated power is much more important than power itself. A 40-watt fluorescent lamp, for example, produces more light than a 40-watt incandescent lamp, but the fluorescent lamp is not nearly as effective as the incandescent light source for a spotlight.

Now, in a laser or maser, the energy is also emitted when atoms drop from a higher energy level to a lower one; however, in this case the atoms are triggered and emit radiation (to a large percentage) in unison. In the case of the Haser, the atoms are triggered to emit radiation in unison by phonon/photon waves within the unit cavity or cell interor. Enough of the energy previously generated is retained within the mass of particulates to maintain emission in a compatible phase, polarization and direction. This phonon wave interacts with the excited atoms and causes them (to a large degree) to emit their excess energy in phase with the stimulating wave before they have a chance to do it randomly.

As a result, the Haser generates a good percentage of its radiated energy so that it travels in synchronism with the standing phonon waves, therefore concentrating the energy emitted as photons.

In effect, the radiated photons from the Haser particulates are all relatively concentrated, monochromatic, and therefore, relatively coherent energy sources. This results in an excellent energy density even though the photons are traveling in practically an infinite number of directions, due to the fact that the particulate sources number in hundreds of millions. The photons moving from particulate to particulate impact and are absorbed by other particulates. Then this STORAGE, BUILDUP, AND RELEASE of the "phase and amplitude of radiated energy", combined with the fine particulate geometry of the Haser power (energy) source, which provides surface area to emit a concentrated array of photons, allows a "maximum efficiency utilization" of the radiated energy within the Haser cavity.

The act of controlling the spectral emissions to most effectively dissociate (for example) water vapor, by sensitizing the host compound properly is another very important point. The monochromatic waves may become distorted in passing through substances, so that harmonic waves are generated at two or more times their original frequency.

Infrared wavelengths may be converted into visible light into ultraviolet waves.

This new system utilizes fine (small) particulates of solid comprised of oxides which are predetermined by design and within which some host atoms are replaced by other frequency sensitive atoms also predetermined by design, which provides stimulated absorption and emission at predetermined wavelengths.

The waste heat passing up the stack heats the conduits to thereby provide the original energy to liberate a massive volume of photons at the frequency range which will activate the sensitive atoms included in the host compound; the fine multi-faceted particulates absorb the photons which normally proceed as phonons through the particulate to generate and provide large numbers of cavity resonances which stimulates emission with each internal excursion; therefore, again, the gain by this regenerative amplifier when driven by the thermal noise fluctuations from the cavity walls, can be significant.

In the case of the HASER, the principle emissions of radiation designed and produced to dissociate the chemical product may be emitted from coatings on the material and walls around the open spaces or cavities in the conduits in FIGS. 5, 8, and 9 for example.

As the reactive mass reaches temperature levels which excite the molecules and atoms to a radiating level of energy, phonons and photons evolve which distribute the thermal energy within the mass. Incidentally, relative to the use of the terms "photon" and "phonon", when a phonon traveling through space impinges on a solid, the resultant wave in the solid is termed a "phonon".

The ability of 'atoms' to store energy has to do with the electrons within the individual atoms. The electrons exist as a cloud of negative charge around the positively charged nucleus. Each election occupies a state of energy and angular momentum that cannot be occupied by any other election.

Therefore, the electrons tend to fill stable shells surrounding the nucleus.

The electrons of the outermost shell are the ones most easily affected by outside forces because of their accessibility. These outer electrons can be moved to higher energy states, but they always tends to return to their lowest energy state. Electrons at certain levels decay (fall to a lower state) more easily than electrons at other levels.

Each excited electronic state of the atom has a characteristic lifetime that indicates the average time it takes an electron to fall to a lower level and therefore radiate a photon. Most excited states have lifetimes of about $10^{-8}$ second.

There are some excited states or levels in all atoms in which the electron cannot decay easily by giving up a photon. Such atoms must therefore wait for other means of giving up their energy, such as colliding with other atoms or with the walls of the system. Electrons in this state of energy tend to stay there for relatively long periods of time (0.001 second or more), and are referred to as being in metastable states. This is an important part of the storing of energy, which can then be retrieved in the excitation process by stimulation.

The normal radiative decay from a higher electronic state to a lower one is termed spontaneous emission. As discussed earlier, processes exist that can force an atomic electron to a higher state or stimulate it to jump to a lower state. An example of forcing, as discussed earlier, is provided when a photon collides with an atom and excites the outer electron to a higher level, which can happen when the energy or wavelength of the photon corresponds exactly to the difference in energy between the state the electron is in and some higher possible state. This process is known as absorption because the photon (energy) is actually absorbed by the atom and all the photon's energy goes into raising the electron to a higher state.

Similarly, as discussed earlier, the stimulated electron can move to a lower level, provided that such a level exists and that the difference between the two levels corresponds to the energy of the incoming photon exactly. The energy given up by the electron in jumping to a lower state goes into creating an additional photon with the same characteristics as the colliding photon.

A large number of atoms can provide an increase in the radiated energy at the desired frequency or energy level, if the population of electrons in the excited states of the atoms is suitably arranged. Consider two excited levels of a system of identical atoms with the electrons divided between the upper and lower levels. If a radiated photon having a wavelength corresponding to the difference in energy between the two levels is allowed to pass through the system medium, it will be amplified if there are more atoms with electrons in the upper state and absorbed if there are more atoms with electrons in the lower state. The condition of having more atoms in the upper state is called a "population inversion" (because it goes against the normal processes of nature, which tend to keep more electrons at lower energies than at higher energies).

The search for new Haser "systems" is therefore not easy, because one is working against the natural tendencies of the electrons.

Another important consideration is the actual 'lifetimes' of the ion energy levels of the impurity atoms involved in the population inversion. The upper level of a two-level system with a population inversion radiates energy corresponding exactly to the difference between the two levels.

The electrons that have thus yielded energy by radiation, end up at the lower level. If they remained there, the situation would result wherein there would be more atoms at the lower level than at the upper level, and as discussed earlier, there would be absorption instead of gain. For continuous operation, one must find impurity atoms with combinations of levels such that the lower level has a short lifetime and the upper level is preferentially populated. This necessity rules out the ion ground state as a possible Haser level, since all ion ground states are metastable. The pair (or more) of ion energy levels which will provide amplification must be energetically above the ground state but still below the metastable states.

Although the original gas laser utilized electrical excitation of electronic transitions, later versions used vibrational transitions in molecules such as carbon dioxide, and the excitation mechanism may involve electrical or chemical excitation, or the burning of fuel. In the chemical laser, atomic species such as hydrogen and fluorine can be reacted to produce molecules in an excited vibrational state which in turn yields amplification or oscillation.

An entirely new excitation process was announced by Garry in 1970. In this, the gas dynamic laser, an appropriate fuel is burned to produce carbon dioxide and nitrogen at high temperature and pressure. When released through a nozzle into the optical resonator region, the gas cools rapidly in terms of its kinetic or translational energy, but the population of the vibrational energy levels of the carbon dioxide molecules becomes inverted since the lower level of the laser transition relaxes more rapidly. In addition, the vibrationally excited nitrogen molecules are in near resonance with the upper laser state of the carbon dioxide and transfer energy with high efficiency to maintain the inversion. This type of 'laser' has produced continuous powers as high as 60 Kw.

The HASER phenomenon as utilized in the present invention, actually uses a thermochemical excitation mechanism. The energy from waste heat prepares the reactant material within the reaction chamber by bringing the material to photon emitting temperatures.

With reference to FIG. 5, suitable host and sensitizer material to be identified below, may be coated on the inner wall of conduit 72 and on the inert spacer elements 76 and 78, to thereby radiate into the adjacent spaces or cavities. Similarly, in the fragmentary views of FIGS. 8 and 9, the hollow metal screen cells 112 (FIG. 8) and the hollow ceramic tubes 114 (FIG. 9) in the conduits 72, are surrounded by metal oxide 116, and the entire mass is heated to elevated temperatures through the walls 72. Included in the structure of the cells 112 (or coated on them), and included in the ceramic tubes 114 is the host and sensitizer material, tailored to absorb input heat energy and to radiate energy at the desired output frequency within the absorption bands of the water vapor.

When water vapor is introduced into the arrangements of FIGS. 1 and 8, for example, the excited billions of photons emitted and traveling between particulates, strike the sensitized "Cavities" with a barrage of photons designed to provide frequency, amplitude, and steric factor impact adequate to dissociate the $H_2O$ molecules. On dissociation, the $2H_2$, and $O_2$ molecules are vibrating at very high temperatures and pressures which are compatible with recombining these molecules through the "activated complex" mechanism into their (high temperature) preferential $H_2O_2+H_2$ molecules, which incidentally evolves more than 33 KCal/mole heat energy. As the steam enters and traverses the cavity, an amount of the steam (depending upon the design of the contents of the reaction chamber and the relative amount of reactant, manganese oxide or other similar metal oxide, and the host/sensitizer material), combines with the reactant, which raises the oxidation level through the process of oxidation; and this of course, evolves heat energy (because this is an exothemic reaction), which, broadcasts more photons of energy throughout the cavity interior, to react with the sensitizers and activators; and this in turn creates massive amounts of new photons of energy to dissociate the water vapor and to help maintain the reaction temperatures within the host materials.

Referring again to FIG. 8, the cavities 112 can be fabricated of very fine mesh woven wire, which is cut into small sections, stamped, folded, and the outer edges of the wire mesh are secured together to form a hollow cell. The wire, of a diameter approximately equal to 0.002 inch, is made up of the elements, compounds, and a metal carrier (inert to the process), and is intially woven and formed into the cells as described above. It is then transformed into the desired host and sensitizer materials through oxidation in an atmospherically controlled furnance or kiln.

Instead of the wire mesh cells 112 as shown in FIG. 8, the preferred form of Haser cavity is shown in FIG. 9 in which a large number of ceramic tubes 114 are present. These tubes are preferably extruded from mullite, which is a common clay having the approximate chemical structure of $2Al_2O_3.SiO_2$ with a range to $3Al_2O_3.2SiO_2$. Suitable quantities of host and sensitizer materials, as described below, are added to, and thoroughly mixed with the mullite prior to extrusion. Subsequent to extrusion the tubes are fired in a suitable kiln or furnance. The tubes may suitably have a diameter of about ¼ inch or ½ and be from ½ inch to 4 inches in length. The sidewalls may be suitable from 1/32 to 1/16 of an inch in thickness, but none of the foregoing dimensions are critical. After firing, the tubes 114 may be provided with filters in both ends. The filters may be of any suitable structure, for example, several layers of metal gauze, to prevent the intrusion of the reactant 116 which may, for example, be manganese oxide. In practice the ceramic tubes 114 may be initially placed in one of the heat exchanges conduits; and then powdered metallic manganese or manganese oxide may be poured in and the entire unit vibrated and rotated until the manganese oxide 116 as shown in FIG. 9 fills all the space around the ceramic tubes 352. With this arrangement, of course, the water vapor is present within all of the ceramic tubes 114 and radiation from the host/sensitizer combination forming part of the ceramic walls 352 radiates intense coherent energy in one or more of the absorption bands of water vapor; and this intense radiation serves to dissociate the hydrogen and oxygen atoms making up the water vapor molecule.

In the tabulation which is set forth below, suitable host materials and sensitizers for applying radiation to water vapor will be set forth. In this tabulation the chemical symbols for the elements will be employed, and the host materials will be listed first followed by the sensitizer material. In each case the absorption band for the host material will initially be given and then the emission wavelength of the sensitizer will be set forth.

| | | |
|---|---|---|
| (a) | $CaWO_4 : Nd^{3+}$ | Where |
| | Absorption = 0.74 microns–0.76 microns | Ca, (Calcium) |
| | Emission = 1.065 microns | W, (Tungsten) |
| | | Nd, (Neodymium) |
| (b) | $CaWO_4 : Nd^{3+}$ | |
| | Absorption = 0.87 microns–0.89 microns | (Same) |
| | Emission = 1.3372 microns | |
| (c) | $Y_3Al_5O_{12} : Er^{3+}$ | Where |
| | Absorption = 0.46 microns–0.47 microns | Y, (Yttrium) |
| | Emission = 1.6602 microns | Al, (Aluminum) |
| | | Er, (Erbium) |
| (d) | $Y_3Al_5O_{12} : Er^{3+}$ | |
| | Absorption = 0.52 microns–0.54 microns | (Same) |
| (e) | $CaF_2 : U^{3+}$ | Where |
| | Absorption = 1.2 microns–1.3 microns | Ca, (Calcium) |
| | Emission = 2.5111 microns–2.613 microns | F, (Fluorine) |
| | | U, (Uranium) |

In the foregoing tabulation it may be noted that there are only three separate combinations of host and sensitizer materials which are being employed. More specifically, the combination of calcium tungstate and neodymium produce output radiations both at 1.065 microns and also at 1.3372 microns as set forth in examples (a) and (b). It may be noted that the absorption wavelengths for the two output emissions differ correspondingly. The combination tabulated in examples (c) and (d) set forth above include yttrium aluminum oxide as the host material and erbium as the sensitizer. In this case, the emitted radiation for both (c) and (d) is at 1.6602 microns; however, the absorption for the two examples is at different frequencies. The final example (e) using calcium floride as the host material and uranium-3 as the sensitizer was mentioned above absorbs at 1.2 to 1.3 microns, and radiates at 2.5111 and at 2.613 microns.

With regard to the matching of the emitted radiation from the sensitizers with the absorption bands for water vapor as a feedstock, reference is made to U.S. Pat. No. 4,148,701 in which a full discussion is presented.

Three additional host-sensitizer combinations which are applicable to water vapor are yttrium aluminum oxide with holmium; calcium tungstate with erbium; and calcium fluoride with dysprosium. These are tabulated below with their absorption and emission wavelengths in microns.

| | |
|---|---|
| (f) $Y_3Al_5O_{12} : Ho^{3+}$ | |
| Absorption: | 0.44–0.46 microns (1) |
| | 1.13–1.17 microns (2) |
| | 1.88–1.93 microns (3) |
| Emission: | 2.0975 microns (1) |
| | 2.0914 microns (2) |
| | 2.1223 microns (3) |
| (g) $CaWO_4 : Er^{3+}$ | |
| Absorption: | 0.2–0.28 microns (1) |
| | 0.46–0.47 microns (2) |
| | 0.52–0.54 microns (3) |

-continued

Emission: 1.612 microns (1), (2), (3)
(h) $CaF_2 : Dy^{2+}$
Absorption: 0.8–1.0 microns
Emission: 2.36 microns Incidentally, the visible spectrum ranges from about: 0.400 microns to about 0.700 microns (4,000 Angstrom units to 7,000 Angstrom units) so the 0.46 to 0.47 micron absorption region is in the blue band of the visible spectrum, and most of the emission wavelengths are in the infrared band.

With regard to the relative quantities of the host and sensitizer material in the mullite, the quantity of host material should be approximately 25 to 1,000 times greater than the amount of associated sensitizer material. A ratio of approximately 0.5% of sensitizer of the amount of host material is the general order of magnitude which should be employed. In addition, the quantity of each particular category of host and sensitizer material such as those set forth in the tabulation of combinations (a) through (h) set forth above, should be proportioned to the absorption bands of the feedback which is being irradiated. Thus, in the particular example under consideration, where the host/sensitizer combination (e) using calcium floride and uranium-3, is matched to a broad absorption band of water vapor, a larger quantity of this host/sensitizer combination should be employed as compared with combination (a),(b) and combination (c), (d). Thus, in the making of the ceramic tubes, the material which is being prepared might include approximately 88% by weight of mullite, 8% by weight of the host/sensitizer combination (e), and 2% by weight of each host/sensitizer combinations (a), (b) and (c), (d). Similarly, in the event that the wire mesh is employed, the host sensitizer/sensitizer combinations may be added in the same proportions to stainless steel wire and the combination material drawn into wires and formed into mesh. Alternatively, after the preparation of the stainless steel wire cells, mullite together with the host sensitizer combinations could be applied in several bands in the plastic state around the stainless steel wire mesh cells, and then fired, to produce the desired result. This result, as mentioned above, involves the provision of spaces throughout a body of material constituting a heat reservoir, and locating host/sensitizer combinations around the boundaries of these spaces or voids in the material.

The chemical formula for mullite was given above, and it is again noted that mullite includes aluminum oxide $AL_2O_3$ and silicon dioxide $SiO_2$ in certain proportions noted above. In order to enhance the "HASER" action and increase the energization of the host/sensitizer combinations (a) through (e) set forth above, a material such as chromium, which acts as a sensitizer in cooperation with the aluminum oxide in mullite which acts as the host material, may be added. The chromium-aluminum oxide, sensitizer-host combination produces strong output radiation at a number of wavelengths, including output radiation centered ar 0.6934 microns, when the $AL_2O_3$ is absorbing energy at 0.5 microns. The radiation centered at 0.6934 is broadened at the high temperature operating conditions so that the radiation extends from 0.6 or 0.65 to 0.75 or 0.8 microns, thus providing supplemental input energy to example (a) set forth hereinabove, which involves absorption at about 0.74 to 0.76 microns. The $AL_2O_3/Cr$ combination may also directly apply energy to the feedback when the output radiation is of the proper frequency and may also pump other host/sensitizer combinations. When chromium is used it will be present in quantities in the order of five percent by weight or less of the mullite employed as the basic material of the tubes 114 shown in FIG. 9.

The primary requirements for potential solid-state Maser/Haser materials are, first, that the composition should fluoresce with a suitably high intensity at elevated temperatures by means of thermal energy alone and, second, that the matrix should be transparent or has no absorption transition at the operation frequency; it should also be chemically stable and have no caustic characteristic.

Preferably, the terminal level of the Haser transition of the active ion should be far enough above the ground state so that three or four-level operation is possible and at elevated temperatures.

The lifetime of the metastable level from which the Haser transition orginates should be, insofar as possible, equal to the lifetime for spontaneous emission with no constraints imposed by competitive dissipation to the matrix. In four-level operation the lifetime of the terminal of the transition must be smaller than that of the metastable level; otherwise, a suitable excess population in the upper level cannot be maintained.

This condition is generally obtained when the terminal level lies in the phonon absorption region, preferably between 6,000 and 19,000 cm$^{-1}$. In addition, it is helpful for the excited active ion to be unable to absorb photons corresponding in energy to the Haser transition. Where such absorption into a higher level or band is possible, the photon/phonon flux in the particulate cavity is reduced and the metastable level depleted.

For best coherence the active ions should occupy equivalent positions in the host structure, so that there will not be a multiplicity of spectra. When these ions are in completely unique sites, the emissions spectrum has the minimum detail and line width consistent with the site symmetry, the crystal field, and the active-ion concentration. In general, the higher the site symmetry the more degenerate the electronic state of the active ion. Therefore, fewer distinct transitions should be observed in fluorescence and, on the average, each emission transition should fluoresce a greater portion of the absorbed energy. However, there are also fewer distinct absorption transitions, and certain emission transitions may be favored in a low-symmetry environment. As long as the emission transitions are few in number, the low symmetry environment may prove to be advantageous by virtue of a broader absorption coverage.

Different classes of active ions seldom find optimum environments in the same host structure. Different activator ions are best accommodated in oxides or fluorides, where the cations of the matrix are approximately equal in size to the activator. $AL_2O_3$, $MgO$, $MgFL_2$, and $ZnF_2$ are typical matrices for transitional ions, $CaF_2$ is particularly useful for divalent rare-earth ions, and $CaWO_4$, $LaF_3$, and $Y_2O_3$ are best suited for trivalent rare-earth ions for lasers. $Y_3AL_5O_{12}$ can readily accommodate both trivalent rare-earth ions and trivalent 3d transitional-metal ions. Certain crystals have conveniently disposed matrix absorption bands and these can be used to absorb pumped radiation over a broad spectrum.

Other factors to be considered in selecting suitable host and sensitizer materials are set forth in my prior U.S. Pat. No. 4,148,701, mentioned above.

An electromatic radiation, (such as radiowave, light, and X-ray) can be characterized by its particular wavelength, LAMBDA, (measured in cm or Å), or by its wave number, NU, (the reciprocal of the wavelength), $\nu = a/\lambda$, commonly expressed in reciprocal centimeters, $cm^{-}$.

Each unit of radiation (a photon) corresponds to a quantum of radiant energy, E, which is directly proportional to a wave number, $\nu$. Since chemical calculations are founded on a mole basis, in discussing the relationship between radiant energy and chemical processes (responsive activators and hosts) it is convenient to express radiant energy in kcal/mole of photons. We can do with this accepted relationship; the radiant energy in 1 mole of photons, with = 350 cm$^{-1}$, is equal to 1 kcal.

Therefore, we can obtain the energy (expressed in kcal/mole) for photons of a given number simply by multiplying the value of $\nu$ expressed in cm$^{31\ 1}$ by the conversion factor:

$$\frac{1 \text{ kcal/mole of photons}}{350 \text{ cm}^{-1}} \quad (4)$$

For example, the energy of light photons with $\nu = 20,000$ cm$^{-1}$ is:

$$\text{energy} = 20,000 \times \frac{1 \text{ kcal/mole of photons}}{350 \text{ cm}^{-1}} = \quad (5)$$

57.1 Kcal/mole of photons and the energy of a single photon of $\nu = 20,000$ cm$^{-1}$ is:

$$\text{energy 1 photon} = \frac{57.1 \text{ kcal/mole of ph.}}{6.02 \times 20^{23} \text{ photons/mole of ph.}} = \quad (6)$$

$9.48 \times 10^{-23}$ Kcal/photon.

The wave number, $\nu$ and the energy, of electromagnetic radiations varies within an extremely wide range $\nu = 10^{14}$ cm for the $\gamma$-rays emitted in nuclear reactions to $\nu = 10^{-6}$ cm for radiowaves. In between these two extremes, there is a continuum of radiations of intermediate wave numbers—the "visible region", which extends approximately from 27,000 cm$^{-1}$ to 13,500 cm$^{-1}$.

In general, when white light strikes a substance, part of the light is absorbed and part is transmitted (if the substance is transparent) or part is reflected (if the substance is opaque). A substance may absorb preferentially the light photons of one (or more) regions of the spectrum, so that the transmitted light or the reflected light is relatively richer in the radiation of the remaining regions.

The combined effect of these remaining radiations is observed as a particular color (when it is in the visible spectrum).

For example, a substance that, when exposed to white light, absorbs almost all photons in the entire yellow—to violet region (say from 17,000 to 27,000 cm$^{-1}$) will "appear red", because only the radiations in the red region of the spectrum (13,500 to about 17,000 cm$^{-1}$), which are not absorbed, remain to be observed.

Similarly, a substance that "appears yellow" absorbs photons of both the green-to-violet region (from 19,000 cm$^{-1}$ to 27,000 cm$^1$) and the red region (from 13,500 to 16,000 cm$^{-1}$) of the visible spectrum.

Since light (radiation) is energy, the absorption of radiation is absorption of energy; it is well known, that, if a substance absorbs light, the corresponding absorbed energy may be used to promote certain atoms, ions, or molecules of a substance from "ground-state" to an "excited state". For example, an atom, ion, or molecule which absorbs a photon of a given wave length takes on a 'quantun' of energy that may serve to promote one electron from a lower energy orbital to a higher (available) energy orbital. In general, different electronic transitions involve the absorption of different quanta of energy.

SPECIFIC EXAMPLES

Some underlying principles involved in the selection of Haser systems have been set out hereinabove and a preferred embodiment has been described which involves water vapor as a feedstock and the generation of hydrogen and/or hydrogen peroxide. It is to be understood that the Haser concept is not limited to the specific embodiment described herein but has more general applicability in the conversion of broad spectrum heat energy or radiation to particular frequencies which lie within the absorption band or bands of any selected feedstock. Further, the feedstock may be gaseous or liquid or even a slurry.

In the following examples, a number of reactions are set forth and these are followed by an identification of a host and sensitizer material which will concentrate the broader spectrum heat energy to one of the absorption bands of the feedstock. Incidentally, in the following examples, in addition to the standard symbols for the elements, the following abbreviations are used: Et for ethyl, C$_2$H$_5$; Ph for phenyl, C$_6$H$_5$; Pr for propyl, C$_3$H$_7$; and Bu for butyl, C$_4$H$_9$. In addition to the host and sensitizers shown in each of the following examples, Al$_2$O$_3$ in mullite and Cr$^{+3}$ may advantageously be used (absorption at 0.5 microns; emission centered at 0.6934 microns). As noted above, the mullite may conveniently be employed to physically support the host and sensitizer materials. In the actual examples set forth below, the host and sensitizer materials implement the HASER concept by shifting the radiation, and concentrating it within the absorption bands of the materials being acted upon. However, in most cases no steam is involved and no sequestering of oxygen occurs. Accordingly, with regard to the implementing apparatus, that disclosed below in connection with FIG. 10, for example, is employed within the heat exchanger apparatus.

The actual examples follows:

EXAMPLE NO. 1

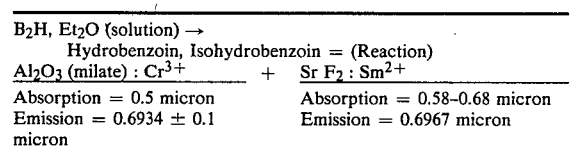

EXAMPLE NO. 2

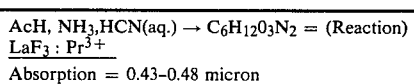

-continued

Emission = 0.5985 micron

EXAMPLE NO. 3

PARALDEHYDE, $O_2 \rightarrow H_2O_2$ = (Reaction)
$CaF_2 : Sm^{2+}$
Absorption = 0.4–0.45 micron
Emission = 0.7085 micron

EXAMPLE NO. 4

HCHO, $FeCl_5$ (aq.) → $FeCl_2, HCO_2H$, HCL = (Reaction)
(glycolaldehyde)
$Y_2O_3 : Eu^{3+}$
Absorption = 0.2–0.28 micron
Emission = 0.6113 micron

EXAMPLE NO. 5

$B_2H$, Aromatic Ketones → Polymers, other Ketones, = (Reaction)
Benzoates
$Y_3Al_5O_{12} : Yb^{3+}$
Absorption = 0.9–1.0 microns Emission = 1.01 microns

EXAMPLE NO. 6

$B_2H$, $PhNO_2$ → $B_2OH$, Several Nitrogen Compounds = (Reaction)
$Nd^{3+} : Cr^{3+}$
Absorption = 0.5 micron
Emission = 1.0612 microns

EXAMPLE NO. 7

$Me_2CO, Et_2O$ (solution) →   150 - Propyl Alcohol,
Additional Compounds = (Reaction)
$CaWO_4 : Nd^{3+}$
Absorption = 0.57–0.60 micron
Emission = 0.9145 micron

EXAMPLE NO. 8

Cyclohexanone → Caproic Acid, Resin, Aldehyde = (Reaction)
$CaF_2 : Tm^{3+}$
Absorption = 0.39–0.46 micron
Emission = 1.116 microns

EXAMPLE NO. 9

Carvone, EtOH (aq.) →   Ketone Resembling Camphor,
Resin = (Reaction)
$CaWO_4 : Pr^{3+}$
Absorption = 0.43–0.49 micron
Emission = 1.0468 microns

EXAMPLE NO. 10

Camphor, EtOH (aq.) →   Campholenic Acid, = (Reaction)
$A, H, C_{10}H_{16}O$
$CaF_2 : Dy^{2+} : Sm^{2+}$
Absorption = 0.58–0.68/0.8–1.0 micron
Emission = 0.6967 micron
2.36 microns

EXAMPLE NO. 11

Coumarin, EtOH, Paraldehyde, → Hydro - DI - Coumarin
or $C_6H_6$ (solution) = (Reaction)
$CaWO_4 : Nd^{3+} : Ho^{3+}$
Absorption =   0.57–0.6 0.74–0.76
0.44–0.46 micron
Emission =   0.9145 micron
1.065 microns
2.046 microns

EXAMPLE NO. 12

Benzoin, EtOH (solution) →   Hydrobenzoin, $AcH_3$, Isoform
Resin = (Reaction)
$Y_2O_3 : Eu^{3+}$
Absorption = 0.87 micron FIG. 10 shows an alternative arrangement for the heat absorbing conduit and reaction zone. More specifically, referring to FIG. 10, it shows in cross section the outer stainless steel tube or conduit 122 and an inner layer 124 of host and sensitizer material of any of the types described hereinabove, and matched in its output spectral characteristic to the absorption bands of the material which is to be passed through the opening 126 at the center of the conduit 122. In the case of the dissociation of water vapor, any of the host and sensitizer combinations designated A through H hereinabove may be employed for the layer 124. It may also be noted that the hollow interior of the conduit 122 will facilitate the transmission of liquids and slurries through the conduit in addition to gases such as water vapor mentioned hereinabove. It may also be noted that, in the arrangement of FIG. 10, no metal oxide is employed; accordingly, the generation of hydrogen may be continuous without the need for successive oxide regeneration or oxygen disproportionation periods of time during which the generation of hydrogen is halted.

Incidentally, in FIG. 10 the arrows directed inwardly toward the outer surface of the conduit 122 indicates schematically the waste heat which is continually applied to the conduit, from the gases passing up the stack or chimney.

FIGS. 11, 12 and 13 represent yet another embodiment for the possible use of waste heat in forming hydrogen and in other chemical reactions, with the embodiment of FIGS. 11 through 13 being at present in the experimental developmental stages. More specifically, the structure of FIG. 11 shows an outer stainless steel conduit 132 having an inner layer of host/sensltizer material 135 and two inner concentric perforated metal cylinders 136 and 138. The cylinder 136 in apertured in a manner indicated generally in FIG. 12 of the drawings. FIG. 13 shows the composite structure of the cylindrical wall 138, which has apertures 140 spaced less frequently than the apertures in the cylindrical wall 136, and covered with a very thin composite film of silver and aluminum. In the schematic showing of FIG. 13, the substrate 142 is a very thin layer of rolled silver, and it is provided with a vapor deposited coating of aluminum 144 which is applied to the layer of silver 142 after it has been secured in place on the screen 138 by epoxy glue or the like. A silver layer is rolled very thin in a manner similar to gold leaf, and may be only a few Angstrom units thick. It is known that a very thin layer of silver will transmit most ultraviolet radiations shorter than about 3100 Angstroms; however, it is known that deposited aluminum layers do not transmit significant amounts of radiation until the wavelength is significantly shorter than 2,000 Angstroms and then transmits freely below 1000 Angstrom units. The use of a very thin rolled silver layer for support of the vapor deposited aluminum layer 248 is a convenient technique for obtaining the desired transmission qualities, emphasizing the transmission through the cylinder 138 of ultraviolet radiations of high intensity, which are well within the ultraviolet absorption band of water vapor at which it readily dissociates.

As shown in FIG. 11, radiation such as that indicated by the line 148, which originates from the host/sensitizer layer 134, will pass through some of the apertures in the cylinder 136, and will be subject to multiple reflections between the two stainless steel cylinders 136 and 138 until the radiation finally passes through one of the openings in cylinder 138, as indicated by the arrowhead 150. The two stainless steel cylinders 136 and 138 form a resonant cavity into which progressively more energy is fed by the radiation from the host/sensitizer layer 134 passing through the openings in cylinder 136. As more and more energy is pumped into the resonant cavity, its energy content increases, as the energy cannot escape, and finally the energy reaches such a high level that the frequency is shifted upward and the contained energy is "dumped" at the higher frequency levels through the selective transmission fill. Incidentally, this frequency shift phenomenon is similar to that which occurs in a kiln, as more and more energy is supplied to it and the temperature within the kiln increases from the infrared to a bright red and finally to white heat, radiating progressively higher frequencies as the energy within the kiln or reservoir increases.

The "wave-compression" or frequency increase is accomplished in resonators where electromagnetic fields can exist whose distributions of amplitudes and phase reproduce themselves upon repeated reflections between mirrored surfaces. These particular electromagnetic field configurations comprise the transverse modes of a passive resonator. The "wave-compression" may be calculated by means of Schroedinger equations involving the Infinite Square-Well Potential.

The "Infinite Square-Well Potential" analysis approach is often used in quantam mechanics to represent a condition in which a particle/wave duality moves in a restricted region of space under the influence of forces which hold it in that region. Although this simplistic potential loses some details of the motion, it retains the essential feature, which is binding a wave particle to a region of a certain size, by means of forces of certain characteristics. The resonator as shown in FIG. 11, with the output filter of FIG. 13, is clearly analogous to the physical systems which have been previously been analyzed using the square-well potential approach. More rigorous mathematical analysis reaching the same conclusions may be accomplished using square-well potential theory and Schroedinger's equation, following the approach set forth in the text entitled, "Quantum Physics of Atoms, Molecules, Solids, Nuclei, and Particles", by Robert Eisberg and Robert Resnick, Copyright 1974 John Wiley & Sons, Inc., pages 226 through 239, and Appendix G, pages G1 through G6.

The action of the high pass filter, including the aluminum and silver layers 142 and 144 associated with the perforated cylnder 138, is similar to the cavity dumping principles employed in lasers. More specifically, it may well be compared to the well-known laser system known as "pulse-transmission mode Q-switching" which is a means for generating extremely short (time) Q-switched laser pulses by Q-switching a laser with 100% reflective mirrors on both ends of the oscillator cavity, and then at the peak of accumulated stored energy, rapidly switching the output mirror from 100% to a very low percent reflection, or high transmission. This allows a very rapid dumping of the accumulated optical energy from within the cavity. As noted above, the effect of the composite screen 142, 144 is very similar in that, as the frequency of the radiation builds up to the ultraviolet levels, it is immediately permitted to radiate through the composite screen and into the central reaction zone within the cylinder 138 to dissociate water vapor therein.

Figure 14:
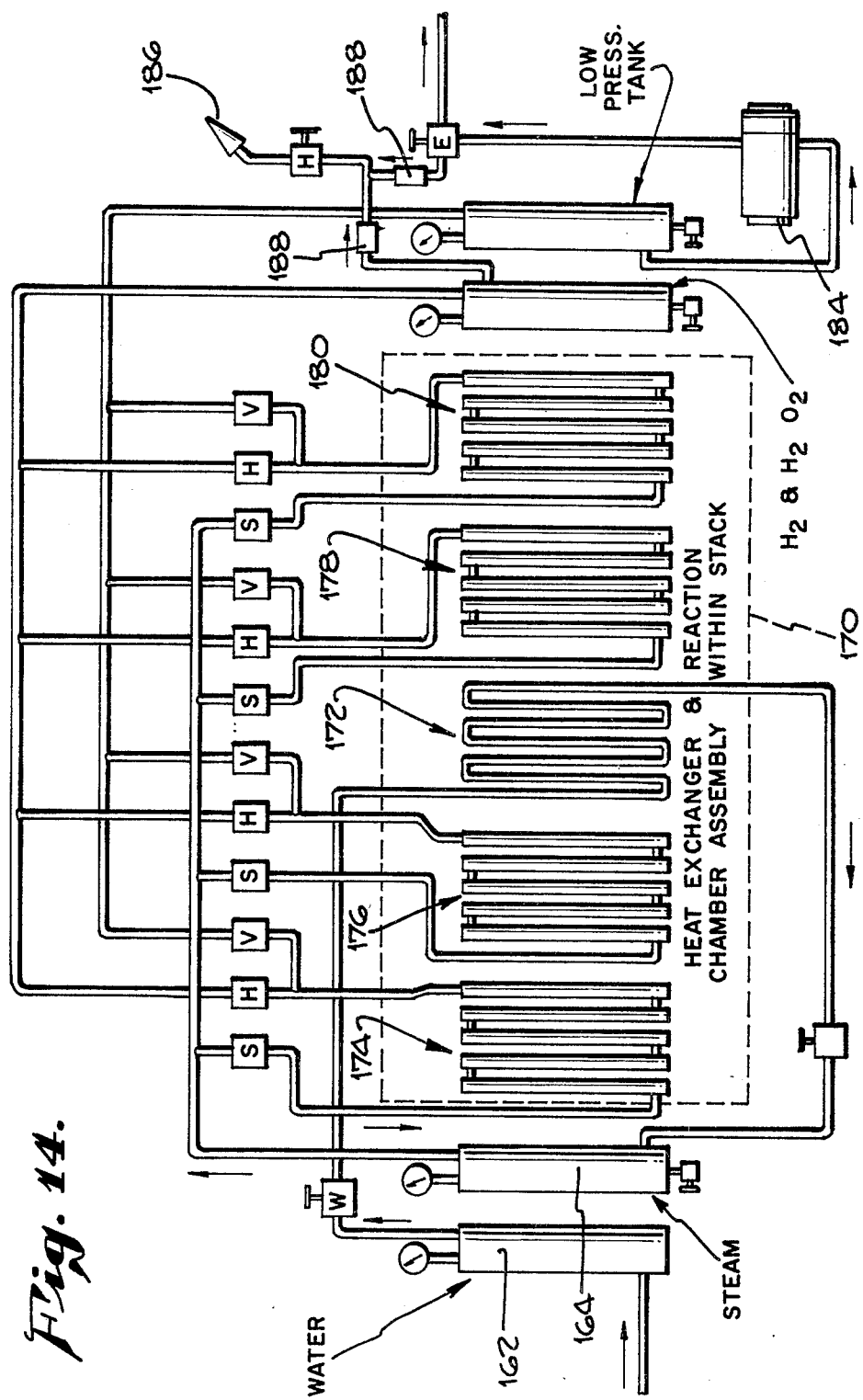

Referring now to FIGS. 14 and 15 of the drawings, the disclosed apparatus is similar in many respects to those shown in FIGS. 1 through 5 of the drawings. More particularly, the apparatus as shown in block diagram form in FIG. 14 includes four reservoirs, 162, 164, 166 and 168 for water, steam, hydrogen and hydrogen peroxide, and finally, the low pressure or vacuum tank 168. In FIG. 14, the block 170 shown in dashed lines represents the space within the stack or chimney from which the waste heat is being derived. Within the stack 170 are located the heat exchanger 172 which is employed to turn water from tank 162 into steam and supply it back to the reservoir 164; and the four combined reaction chamber and heat exchange units 174, 176, 178 and 180. Associated with each of the units 174, 176, 178 and 180 are three valves designated S, H and V. The four reaction chamber units are operated sequentially so that hydrogen or hydrogen peroxide is generated continuously. Regarding the cycle for each one of the individual units, initially the input valve designated "S" is opened to admit steam; and the output valve designated "H" is opened to the hydrogen and hydrogen peroxide storage tank 166. After a predetermined period of time, when most of the reactant in the reaction chamber, such as 174, has been oxidized to a higher oxidation state, the hydrogen valve designated "H" is closed, and the valve "V" leading to the low pressure or vacuum chamber 168 is opened to disproportionate the metal oxide at a lower pressure. The sequential mode of operation is disclosed in greater detail in my prior patents cited hereinabove.

Also shown in FIG. 14 is the vacuum pump 184 and the torch or burner 186 which is shown to indicate a useful load. Suitable check valves 188 may be provided as indicated, and elsewhere in the system, such as in association with the "H" valves leading from each reaction chamber to the hydrogen and hydrogen peroxide reservoir 166. The valve designated "E" indicates the exhaust from the vacuum pump 184.

FIG. 15 shows a pilot plant implementation of the system diagrammatically shown in FIG. 14. In FIG. 15, the stock 170 is shown at the upper left, and encloses the small diameter piping 172 wherein the steam is formed, in addition to the reaction chamber—heat exchanger assemblies 174, 176, 178 and 180. The conduits generally indicated by reference numeral 192 interconnect the heat exchanger components with the remainder of the apparatus located outside of the stack, and including the four reservoirs 162, 164, 166 and 168. The cyclic operation of the four heat exchanger—reaction chamber units is controlled by the cams 194 which operate the valves S, H, and V associated with each of the four reaction chambers. The cam shaft is driven by a small electric motor 196. The remaining components shown in FIG. 15 generally carry the same reference numerals as the corresponding parts shown in the diagram of FIG. 14.

It may be noted in passing that each of the heat exchanger—reaction chamber units 174, 176, 178 and 180 includes a series of vertically oriented conduits of relatively large diameter, interconnected by smaller diameter conduits at the top or the bottom, so that flow through the larger diameter upright conduits is maintained from one end of the first large diameter conduit to the end of the last one. In practice, the small diameter horizontal tubes interconnecting the larger diameter conduits, are empty; but the larger diameter vertically extending conduits contain metallic oxide, such as manganese oxide, having a cross sectional configuration somewhat like that shown in FIG. 5. When the oxide containing reaction chambers are vertically oriented, there is little opportunity for the water vapor to by-pass the oxide material, unlike a horizontal configuration, for example, wherein the oxide might fall away from the upper wall and permit unhindered flow of the steam through the system without dissociation. Concerning the mode of forming spaces within the metal oxide, such as manganese oxide, one possible arrangement has been discussed hereinabove in connection with FIG. 5. In another alternative embodiment, the metal oxide may be initially mixed up in a batch interspersed with a material which will be driven off at higher temperatures but below the operating temperature of the unit. In one case, a substantial quantity of very thin spaghetti was employed, and the result after driving off the spaghetti through heating to elevated temperature, was porous and channeled so that good flow of steam via a circuitous path through the metal oxide was achieved.

Incidentally, the preferred metallic oxide, manganese oxide has several oxidation state. At atmospheric pressure $MNO_2$ disproportionates to $MN_2O_3$ at 535 degrees centigrade, which corresponds to approximately 995 degrees Fahrenheit and about 808 degrees Kelvin. Also, $MN_2O_3$ disproportionates to $MN_3O_4$ at approximately 1,080 degrees Centigrade, corresponding to approximately 1,976 degrees Fahrenheit or 1,353 degrees Kelvin. With an assumed stack temperature in the order of 1,200 degrees Kelvin, or about 927° C., or 1,701 degrees Fahrenheit, the disclosed system will absorb oxygen and disproportionate between $MNO_2$ and $MN_2O_3$, under normal conditions. However, when temperatures above 1,080 degrees C. are present in the stack, additional oxidation and sequestering of the oxygen may take place to include the $MN_3O_4$ oxidation state of manganese.

Now, turning to a consideration of temperatures and radiation frequencies, operation at a temperature in the order of 1000 degrees Kelvin will be briefly considered. Initially, it is noted that 1000 Kelvin is in the order of 727 degrees Centigrade, and this in turn is in the order of 1340 degrees F. As noted hereinabove, the temperature for the dissociation of $MnO_2$ to $Mn_2O_3$ at atmospheric pressure is approximately 535 degrees C. Accordingly, at the higher temperature of 1000 degrees Kelvin or 727 degrees C., such dissociation at a reduced pressure of perhaps 1/10th atmosphere will go forward rapidly. At lower temperatures, even below 535 degrees C., the process may still be operated, but with oxides other than manganese oxide. Other metals and oxides thereof which may be used, are mentioned in column 37 of my prior U.S. Pat. No. 4,113,589, and these include antimony, cesium, barium, iron, manganese, chromium, iridium, nickel, and thallium, and eutectics or alloys of these metals and their oxides. Specific oxides which may be used and their minimum temperatures include lead oxide having a critical disproportionation temperature of 370 degrees C., nickel oxide having a critical temperature of about 600 degrees C., potassium peroxochromate having a critical temperature of only 100 degrees C., Strontium oxide, having critical temperature of 215 degrees C., and telurium oxide having a critical temperature of about 400 degrees C. If desired, the units 21, 22, 23 and 24 may include different oxides, with the cooler gases toward the upper portion of the stack being uitilized to work with some of the oxides which disassociate at atmospheric pressure at temperatures below manganese oxide, for example. Alternatively, if the stack gases remain at a reasonably high temperature as they pass the heat exchange units 21 through 24, or in the event that arrangements such as those shown in FIGS. 3 and 4 are employed, a single oxide such as manganese oxide may be employed.

It may also be noted with regard to the radiation inward from the walls of the pipes which are exposed to the exhaust gases, that a temperature of 1000 degrees Kelvin will produce radiation in a "black body" which will peak at a wavelength of approximately 2 microns, as shown in FIG. 15 of U.S. Pat. No. 4,113,589 cited hereinabove, and the radiation will extend to a significant degree into the lower frequency end of the visible spectrum. In this connection it may be useful to note that the visible spectrum extends from about 0.4 to 0.7 microns, corresponding to 400 to 700 millimicrons, and the equivalent band expressed in Angstrom units is 4,000 to 7,000 Angstrom units. With an ambient temperature in the order of 1000 degrees Kelvin, ample excitation for the host/sensitizer combinations as set forth hereinabove is available. In the event of somewhat lower exhaust gas temperatures, supplemental heating from the generated hydrogen may be employed locally at the individual heat exchange units, or may be supplied to the main process to further increase its temperature, and both of these possibilities are indicated by the feedback conduit 152 as shown in FIG. 1.

In closing, it is to be understood that the foregoing description and the drawings merely refer to one illustrative embodiment of the invention. Thus, by way of example and not of limitation, the heat exchange arrangements may have any suitable configuration which enhances heat transfer and minimizes back pressure, and these may be other than those shown in the drawings; the dissociation of the water vapor may be accomplished by (a) the sequestering of oxygen from water vapor by metallic oxides, (b) the generation of suitable frequencies within the absorption bands of water vapor by suitable host and sensitizer combinations, (c) by appropriate multiphoton absorption processes, and (d) any combination of the foregoing including the further dissociation of water vapor by high excitation photons or particles; and other filtering materials may be employed which are different from those disclosed in connection with FIG. 13 of the drawings. Accordingly, it is to be understood that the present invention is not limited to the embodiments precisely as described hereinabove and as shown in the accompanying drawings.

What is claimed is:

1. An apparatus for generating hydrogen gas or hydrogen peroxide from waste heat in which the waste heat is going up a chimney or a stack as heated gases, comprising:

a heat exchanger structure exposed to said heated gases, said gases having a predetermined temperature;

a reactant including at least one metal oxide having more than one oxidation state, and having the property of dissociating oxygen and returning to its lower oxidation state at atmospheric pressure at a temperature below said predetermined temperature, and of sequestering oxygen from water vapor at elevated pressure at said temperature;

means for mounting said reactant to be heated by said heat exchange structure substantially to said predetermined temperature;

means for supplying water vapor to said reactant at an elevated pressure to form hydrogen gas and/or hydrogen peroxide as said reactant is oxidized;

means for reducing the pressure to disproportionate oxygen from the reactant;

means for providing spaces within said reactant;

host and sensitizer means located adjacent said spaces to absorb heat energy and to radiate high intensity energy within the absorption bands of said water vapor into said spaces to dissociate a portion of said water vapor.

2. An apparatus as defined in claim 1 wherein said heat exchanger structure includes a plurality of metal conduits within said stack, said conduits containing said reactant, whereby hydrogen gas and/or hydrogen peroxide may be generated continuously.

3. An apparatus as defined in claim 1 wherein a plurality of said heat exchanger structures are located successively at different heights along said stack.

4. An apparatus as defined in claim 1 further comprising means for picking up waste gases containing substantial quantities of carbon monoxide and passing them over the reactant to assist in reducing the oxidation state of the reactant.

5. An apparatus as defined in claim 1 wherein means are provided for generating steam from the waste heat passing through said stack.

6. An apparatus as defined in claim 1 further comprising additional heat exchange means external to said stack for cooling the generated hydrogen gas and/or hydrogen peroxide and for heating incoming water to be converted into steam or water vapor.

7. An apparatus as defined in claim 1 wherein said temperature is above 600 degrees C. and said reactant is manganese oxide.

8. An apparatus for generating hydrogen gas or hydrogen peroxide from waste heat in which the waste heat is going up a chimney or a stack as heated gases, comprising:

a hollow heat exchanger structure exposed to said heated gases, said gases having a predetermined temperature;

means for supplying water vapor into said heat exchange structure to form hydrogen gas and/or hydrogen peroxide; and host and sensitizer means located on the inner walls of said hollow heat exchanger structure to absorb heat energy and to radiate high intensity energy within the absorption bands of water vapor to dissociate said water vapor and to form hydrogen and/or hydrogen peroxide.

9. An apparatus as defined in claim 8 further comprising means for shifting the frequency of the output radiation from said host and sensitizer means into the ultraviolet frequnecy range.

10. An apparatus as defined in claim 9 wherein said frequency shifting means includes film means for selectively reflecting lower frequencies and transmitting higher frequencies.

11. An apparatus as defined in claim 8 further comprising metal oxide means for selectively sequestering oxygen from water vapor at elevated pressures and for disproportionating oxygen at reduced pressures.

12. An apparatus for generating hydrogen gas or hydrogen peroxide from waste heat in which the waste heat is going up to a chimney or a stack as heated gases, comprising:

a heat exchanger structure exposed to said heated gases, said gases having a predetermined temperature;

a reactant including at least one metal oxide having more than one oxidation state, and having the property of dissociating oxygen and returning to its lower oxidation state at atmospheric pressure at a temperature below said predetermined temperature, and of sequestering oxygen from water vapor at elevated pressure at said temperature;

means for mounting said reactant to be heated by said heat exchange structure substantially to said predetermined temperature;

means for supplying water vapor to said reactant at an elevated pressure to form hydrogen gas and/or hydrogen peroxide as said reactant is oxidized; and means for reducing the pressure to disproportionate oxygen from the reactant.

13. An apparatus as defined in claim 12 wherein said heat exchanger structure includes a plurality of metal conduits within said stack, said conduits containing said reactant, whereby hydrogen gas sand/or hydrogen peroxide may be generated continuously.

14. An apparatus as defined in claim 12 wherein said heat exchanger structure includes a plurality of large diameter generally vertically disposed conduits containing said reactant, and transverse conduits interconnecting the ends of said large diameter conduits.

15. An apparatus as defined in claim 12 wherein said heat exchanger structure includes at least three separate chambers containing said reactant, and wherein valve means are provided for generating hydrogen and/or hydrogen peroxide continuously through sequential operation of said chambers.

16. A method for generating hydrogen gas or hydrogen peroxide from waste heat in which the waste heat is going up a chimney or a stack as heated gases, comprising the steps of:

exposing a hollow heat exchanging structure to said heated gases, said gases having a predetermined temperature;

mounting a reactant in said hollow heat exchanger, said reactant including a metal oxide having more than one oxidation state;

supplying water vapor to said reactant at an elevated pressure to form hydrogen gas and/or hydrogen peroxide as the oxygen is sequestered from said water vapor and the reactant is oxidized;

reducing the pressure within said heat exchanger to disproportionate oxygen from said reactant;

lining the inner walls of said hollow heat exchanger with host and sensitizer material to absorb heat energy from the walls of said heat exchanger and to radiate high intensity energy within the absorption bands of said water vapor to dissociate at least a portion of said water vapor.

17. A method as defined in claim 16 comprising the additional step of directing waste gases obtained from said stack and containing substantial quantities of carbon monoxide over the reactant to assist in reducing the oxidation state of the reactant in the course of disproportionating the oxygen therefrom.

18. A method for generating hydrogen gas or hydrogen peroxide from waste heat in which the waste heat is going up a chimney or a stack as heated gases, comprising the steps of:

exposing a hollow heat exchanging structure to said heated gases, said gases having a predetermined temperature;

supplying water vapor to said hollow heat exchange structure; and lining the inner walls of said hollow heat exchanger with host and sensitizer material to absorb heat energy from the walls of said heat exchanger and to radiate high intensity energy within the absorption bands of said water vapor to dissociate said water vapor.

19. A method as set forth in claim 18 comprising the additional step of shifting the frequency of radiation from said host and sensitizer material upward into the ultraviolet frequency range, by passing it through a resonant cavity having an output high pass filtering film for applying ultraviolet radiation to said water vapor.

20. A method for generating hydrogen gas or hydrogen peroxide from waste heat in which the waste heat is going up a chimney or a stack as heated gases, comprising the steps of:

exposing a hollow heat exchanging structure to said heated gases, said gases having a predetermined temperature;

mounting a reactant in said hollow heat exchanger, said reactant including a metal oxide having more than one oxidation state;

supplying water vapor to said reactant at an elevated pressure to form hydrogen gas and/or hydrogen peroxide as the oxygen is sequestered from said water vapor and the reactant is oxidized; and reducing the pressure within said heat exchanger to disproportionate oxygen from said reactant.

21. An apparatus for utilizing waste heat to dissociate a chemical substance, in which the waste heat is going up a chimney or a stack as heated gases, comprising:

a hollow heat exchanger structure exposed to said heated gases, said gases having a predetermined temperature;

means for supplying a chemical substance to be dissociated into said heat exchange structure, said chemical substance having a predetermined frequency absorption band or bands; and host and sensitizer means located within said hollow heat exchanger structure to absorb heat energy and to radiate high intensity energy within said absorption band or bands of said chemical substance to dissociate said chemical substance.

22. A method for utilizing waste heat to dissociate chemical compounds, in which the waste heat is going up a chimney or a stack as heated gases, comprising the steps of:

exposing a hollow heat exchanger structure to said heated gases, said gases having a predetermined elevated temperatures;

supplying a chemical compound to said hollow heat exchanger structure; said chemical compound having a predetermined frequency absorption band or bands; and irradiating said chemical compound with high intensity radiation within said absorption band or bands at energy levels sufficient to dissociate said chemical compound by host and sensitizer material mounted within said hollow heat exchanger to shift and concentrate the heat radiation energy into said absorption band or bands.

* * * * *